United States Patent [19]

Trickett et al.

[11] Patent Number: 4,833,000

[45] Date of Patent: May 23, 1989

[54] CERAMIC MONOLITHIC STRUCTURE HAVING AN INTERNAL CAVITY CONTAINED THEREIN AND A METHOD OF PREPARING THE SAME

[75] Inventors: Elizabeth A. Trickett, Framingham; Richard C. Assmus, Braintree, both of Mass.

[73] Assignee: GTE Laboratories Incorporated, Waltham, Mass.

[21] Appl. No.: 101,910

[22] Filed: Sep. 28, 1987

Related U.S. Application Data

[62] Division of Ser. No. 925,643, Oct. 31, 1986.

[51] Int. Cl.$^4$ .................. B32B 3/10; C04B 33/34; C04B 33/32
[52] U.S. Cl. .................. 428/137; 428/138; 428/901; 156/89; 264/56
[58] Field of Search .................. 156/89; 428/137, 138, 428/901; 264/56, 58, 59

[56] References Cited

U.S. PATENT DOCUMENTS

| | | | |
|---|---|---|---|
| 3,179,535 | 4/1965 | Comton | 156/89 |
| 3,940,301 | 2/1976 | Straw et al. | 156/155 |
| 4,026,746 | 5/1977 | Straw | 156/155 |
| 4,610,741 | 9/1986 | Mase et al. | 156/89 |

FOREIGN PATENT DOCUMENTS

| | | | |
|---|---|---|---|
| 0002209 | 2/1979 | Japan | 156/89 |
| 1418459 | 12/1975 | United Kingdom | 156/89 |

Primary Examiner—John E. Kittle
Assistant Examiner—P. J. Ryan
Attorney, Agent, or Firm—Ivan L. Ericson

[57] ABSTRACT

A method of preparing ceramic monolithic structures with an internal cavity and passageways is described. A thin sheet of a ceramic material is formed by spreading the material on a glass plate with a doctor blade. Individual sheets of the material are cut or punched to form predetermined holes, channels or various shapes therein. These individual sheets are then stacked to form a layered structure. A supporting media such as paraffin wax is injected into the holes and channels to completely fill them with the media. The layered structure is then pressed by unipressing and/or isostatic pressing followed by a prefiring step to remove the supporting media. Once the supporting media had been completely removed, the layered structure is then sintered to form a monolithic structure containing precise predetermined internal cavity and passageways.

3 Claims, 2 Drawing Sheets

CERAMIC MONOLITHIC STRUCTURE HAVING AN INTERNAL CAVITY CONTAINED THEREIN AND A METHOD OF PREPARING THE SAME

This is a of co-pending application Ser. No. 925,643 filed On Oct. 31, 1986.

FIELD OF THE INVENTION

This invention relates to a ceramic structure having an internal cavity and a method of preparing the same. More particularly, this invention relates to a ceramic monolithic structure having an internal cavity connected to the surface by a passage and a method of preparing the same.

BACKGROUND OF THE INVENTION

Typically, materials in high temperature applications require shields incorporating channels for cooling. These shields are usually metal and must be thin and lightweight. They present problems because of their thermal expansion and their limited access and application, e.g. in the case of transparent IR windows. Attempts to isopress and sinter transparent ceramic window followed by drilling cooling manifolds in the ceramic windows has resulted in limited hole geometry capability.

Thin laminated ceramic structures containing small holes (0.006") for wire accommodation are routinely prepared for the electronics industry. Such multilayer structures are typically 0.001" to 0.050" thick and are laminated sandwich fashion with metal circuit layers screened on several if not all layers. Photo resist, carbon or other material patterns may also be layered between ceramic layers and may then be burned out to leave voids, shapes, manifolds, etc. However, very large manifolds in thick layers cannot be prepared by this method as the hole integrity is lost during pressing and in addition burnout problems often result in delamination. To date the tape casting method of ceramic body preparations has been limited by thickness and the lack of three dimensional capability. Dry pressing and extrusion have been considered more favorable for thicknesses greater than an eighth of an inch.

SUMMARY OF THE INVENTION

In accordance with one aspect of the present invention, a new and improved method for preparing a ceramic monolithic structure comprises the following steps:

Step 1—a layered structure having a surface and a cavity contained therein is formed by stacking individual sheets of a ceramic material. Predetermined individual sheets having apertures therein. The individual sheets are stacked in a predetermined sequence to form a layered structure having a passageway and a cavity therein. The layered structure formed by the stacking of the individual sheets has a surface and a cavity connected to the surface thereof by a passageway.

Step 2—the cavity and the passageways contained within the layered structure are filled with a supporting media having a melting point greater than a pressing temperature obtained during a subsequent pressing step.

Step 3—the product from step 2 is pressed sufficiently to form a layered structure.

Step 4—the supporting media is removed from the cavity and the passageway of the product from step 3.

Step 5—the product from step 4 is sintered at a temperature sufficient to form a monolithic structure having a surface. The monlithic structure has a cavity contained therein and a passageway connecting the cavity to the surface of the monolithic structure.

For a better understanding of the present invention, together with other and further objects, advantages and capabilities thereof, reference is made to the following disclosure and appended claims in connection with the above-described drawing.

DETALED DESCRIPTION OF THE INVENTION

Figure 1:
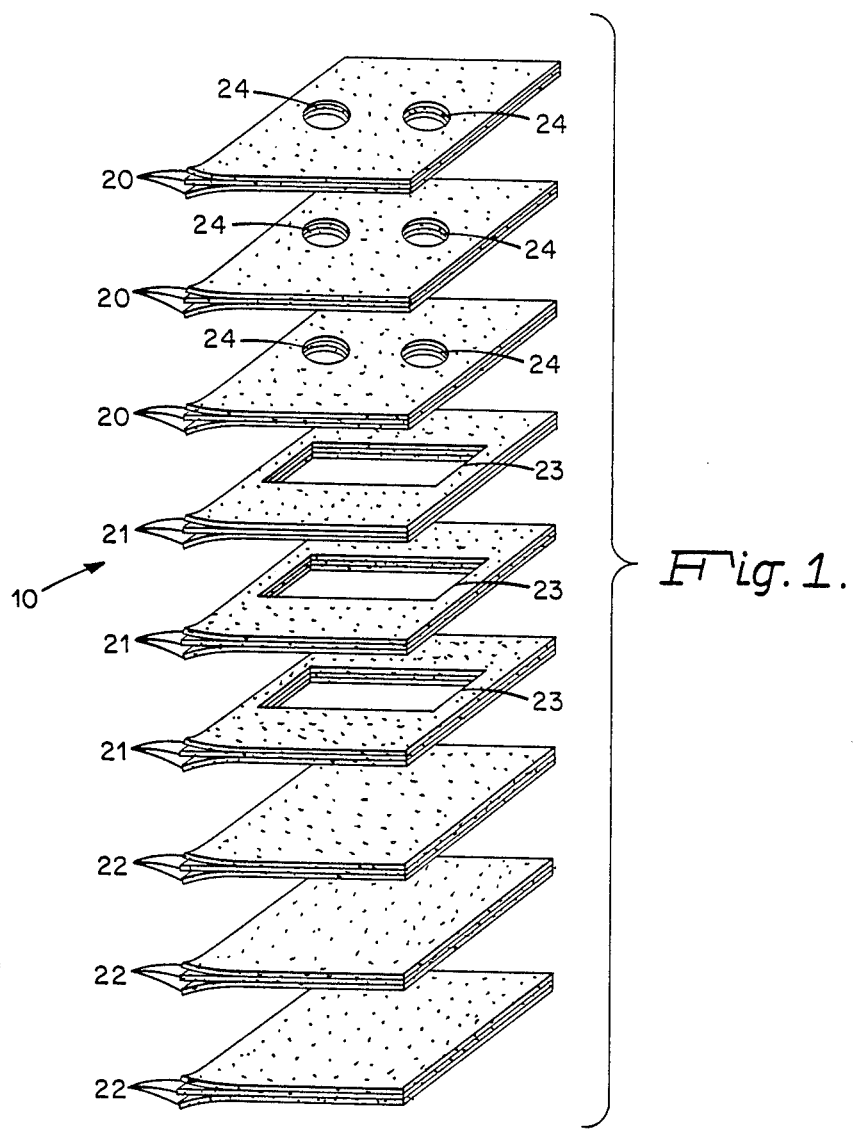
FIG. 1 is an exploded view showing individual ceramic sheets used in forming a layered structure in accordance with the present invention.
Figure 2:
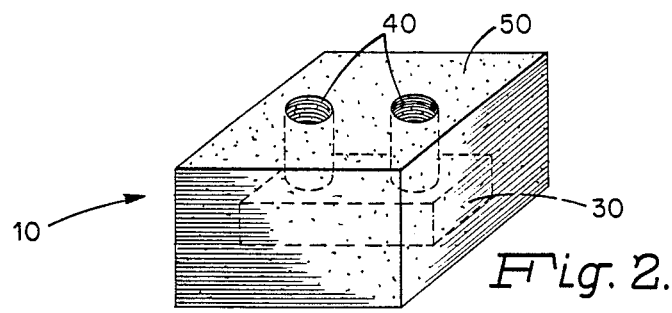
FIG. 2 is a perspective view of the stacked individual ceramic sheets showing a cavity contained therein connected by passageways to the surface of the layered structure in accordance with the present invention.
Figure 3:
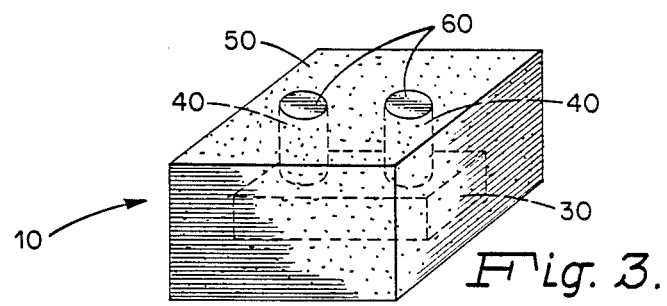
FIG. 3 is a perspective view of the layered structure shown in FIG. 2 showing the cavity and passageways contained therein filled with a supporting media in accordance with the present invention.

Referring now to the drawings with greater particularity, there is shown in FIG. 1 an exploded perspective view of a layered structure 10 depicting individual sheets of ceramic material 20, 21, 22, made by forming a large sheet of a ceramic material, such as alumina, lanthana, yttria, magnesia, aluminum oxynitride, silicon nitride, and magnesium aluminate or combinations thereof which was cut into individual sheets 20, 21, and 22. Predetermined individual sheets were punched or cut out to form apertures 23 and 24 of individual sheets 20 and 21, respectively. The individual sheets were stacked in a predetermined order to form a layered structure 10 as depicted in FIG. 2. The individual sheets containing apertures 23, such as rectangular shaped holes, formed the cavity 30 shown in FIG. 2 and the individual sheets containing apertures 24, such as round holes, formed the passageways 40 which connected the cavity 30 with surface 50 of the layered structure 10. In FIG. 3 cavity 30 and passageways 40 of the layered structure 10 were filled with a supporting media 60, such as a paraffin wax having a melting point of 60° C., by heating the paraffin wax above its melting point and inserting the wax into the passageways 40 using a hypodermic needle, filling the cavity 30 as well as the passageways 40. The supporting media 60 is then allowed to cool and solidify. The layered structure 10 having the supporting media 60 completely filling the cavity 30 and passageways 40 is then pressed to form said layered structure 10 having a green strength. The temperature obtained during pressing is 60° C.

Figure 4:
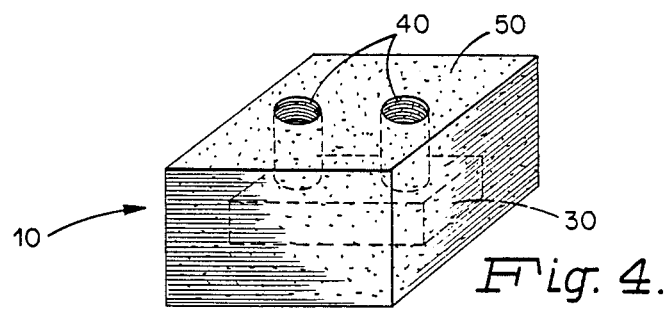
FIG. 4 is a perspective view of the layered structure shown in FIG. 3 after the supporting media has been removed from the cavity contained therein and the passageways connecting the cavity to the surface in accordance with the present invention.
Figure 5:
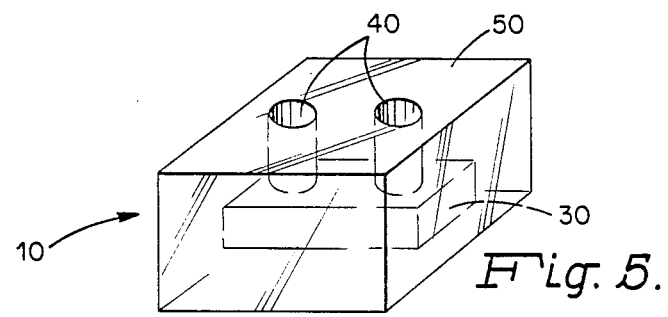
FIG. 5 is a perspective view of a transparent monolithic structure formed from the layered structure as shown in FIG. 4 by the step of sintering in accordance with the present invention.

The supporting media 60 contained in the layered structure 10 as depicted in FIG. 3 is removed by heating (prefiring) the layered structure 10 above the melting point of the supporting media 60 and draining the cavity 30 and passageways 40 by gravity to form a layered structure 10 as depicted in FIG. 4 without supporting media 60. The layered structure 10 as depicted in FIG. 4 is then sintered at a temperature sufficient to form a transparent monolithic structure 10 having a surface 50, a cavity 30 as connected with surface 50 by passageways 40.

PREPARATION PROCEDURE

1. A large ceramic sheet from about 1 mil to about 100 mils thick is formed from ceramic powder with suitable binders and/or plasticisers and thinners. The large ceramic sheet is dried and individual sheets are cut from the large sheet.

2. The individual sheets are cut or punched to form apertures such as holes, channels or other geometries in predetermined locations in the individual ceramic sheets. In the event that slant or angled passageways, are required such as jets, a template is moved by the use of a micrometer to align the sheets properly and a ceramic sheet is then punched to form the requisite apertures, then the next ceramic sheet will be punched after incrementally moving the micrometer/template. In this fashion apertures, such as holes, may be positioned with high precision.

3. The punched ceraic sheets are stacked and aligned to form a layered structure about 0.5 inches thick and clamped lightly between two templates which may be evacuated if desired.

4. A supporting media, such as paraffin wax, is heated and introduced as a liquid into the holes, e.g. via hypodermic needle and allowed to solidify. The apertures are completely filled with the supporting media which will support the geometric shapes during uni-and/or isostatic pressing. The supporting media material must be compatible with the system, it must be solid and must not soften at the desired pressing temperatures and must have a melting point at a temperature slightly higher than the pressing temperatures. The supporting media must not form a residue during the burnout procedure. An example of such a supporting media is a paraffin wax having a melting point of 60° C. However, the supporting media is not limited just to a paraffin wax. It can be any low melting point material which can conform to the manifold shapes and can be easily removed after pressing and is compatible with the ceramic powder, e.g. Woods metal may be used if some contamination by the metal is not a problem.

5. The structure complete with supporting media is unipressed (may be performed between heated plattens) then isopressed in an evacuated bag to finally consolidate the sample.

6. The structure is removed from the isostatic pressing bag, placed in a prefire/burnout oven on suitable furnace furniture, e.g. $Al_2O_3$ having a flat shape, or a domed shape, or any shape as required by the final geometry of the product. When large quantities of supporting media are used in the apertures, such as cavities, passageways, manifolds, the structure is prefired in a suitable position to allow the melted supporting media to "drain away" from the structure.

7. Routine sintering and annealing cycles result in transparent monolithic structures containing precise geometric cavities and passageways through which coolant may be allowed to flow.

EXAMPLE 1

A powder formulation of about 100 grams of lanthana doped yttria powder was ball milled for 6 hours in methanol. The ball milled material was then dried and any large pieces were broken down in a mortar and pestle. This material was then combined with a binder formulation of 100 grams of 73216 TAM-CERAM (TAM Ceramic Inc. of Niagara Falls, N.Y. trademark) binder, 7 grams of ethylene glycol 200, and 10 grams of 76990 TAM-CERAM thinner. This mixture was then ball milled for 16 hours. The ball milled mixture was then formed into a sheet by spreading the mixture on a glass plate with a doctor blade to form a large sheet of a predetermined thickness such as 10 mils. The large sheet was cut into individual sheets and holes were punched in predetermined locations on ⅓ of the sheets and channels were cut in predetermined locations in another ⅓ of the sheets. Then all of the sheets were stacked and aligned to form a layered structure comprising approximately 45 layers of the individual ceramic sheets. The individual sheets were aligned in such a way as to form the predetermined geometric cavity and passageways from the cavity to the surface. The structure was then placed in a jig and lightly clamped. A paraffin wax was heated to liquify it and then injected into the passageways and the cavity within the layered structure with a hypodermic needle to completely fill the passageways and cavity and then it was allowed to solidify. The solidified wax supports the cavity and passageways during the pressing operation preventing any distortion of their position and geometrics. The structure was then uni-pressed at approximately 4000 lbs. RAM force. This was followed by isopressing at approximately 7.5 kpsi. The pressed structure was then prefired at a predetermined firing profile to liquify the paraffin wax so the wax drained away from the cavity and passageways of the layered structure and also to remove binder and other organic materials from the pressed structure. The following prefiring profile was used:

| Temperature | Rate | Time |
| --- | --- | --- |
| 40–150° C. | 10° C. per hr | 11 hrs |
| 150–300° C. | 10° C. per hr | 15 hrs |
| 300–400° C. | 15° C. per hr | 6.6 hrs |
| 400–600° C. | 50° C. per hr | 4 hrs |
| 600–1200° C. | 100° C. per hr | 6 hrs |
| 1200° C. | Held at 1200° C. | 2 hrs |
| Cool at furnace rate to 20° C. | | 2 hrs |

The above prefiring profile allows for the complete removal of the paraffin wax and the consolidation of the layered structure prior to sintering. The prefired structure is then sintered at a temperature of about 2150° C. for 1½ hours followed by annealing at 1950° C. for 1½ hours to form a transparent monolithic structure having the requisite cavity and passageways therein.

EXAMPLE 2

A ceramic sheet was prepared by milling 145 lanthana doped yttria powder with 114 g of #73216 TAM-CERAM binder and 15 g #76990 TAM-CERAM thinner, for 16 hrs. The resulting slip was deaired by allowing it to stand for ½ hr, then formed into a large sheet on a glass plate with a doctor blade. After drying the ceramic sheet was cut into circles 0.012" thick and 4" outside diameter. Thirty such layers were sandwiched together and pressed between two watch glasses. A clamp was placed on the watch glasses and then the 'confined' layered structure was dried at 75° C. for 1 hr. The dried dome-shaped layered structure was removed from the clamped watch glasses and placed on top of an aluminum dome-shaped die. A rubber cover was placed on the layered structure and an aluminum shroud was used to encase the die. The assembly was pressed at 4000 lbs. ram force on a uniaxial press. The resulting pressed dome-shaped layered structure was prefired at the same profile as in Example 1. This prefiring removes any remaining support media if present. The dome-shaped layered structure (dome) was intact with no sign of delamination after the prefiring step or the sintering step. However, after the sintering step one edge of the dome was wavy indicating the need for supportive furnace furniture during the sintering step.

Based on the preceding example, a die has been designed to eliminate the need for watch glasses. Apertures, such as channels and/or holes, can be punched in the individual sheets at predetermined locations to provide a cavity and passageways in the final product. The individual sheets can be stacked and aligned to provide passageways and a cavity in a predetermined location and placed in the metal die. A support media such a paraffin wax can be injected as a hot liquid into the predetermined passagways and cavity to completely fill them. The wax is allowed to cool to form a solid. The stacked sheets forming a dome-shaped layered structure in the metal die are then pressed at 4000 lbs. ram force on a uniaxial press or they can be isostatically pressed. Then the pressed domed shaped layered structure can be removed from the die and prefired at the same temperature and time profile as in Example 1 to remove the support media as discussed in Example 1. A cup shape made from molybdenum and lined with yttria sintering particles (~0.025 mm) to avoid drag is used to hold the dome-shaped layered structure during sintering and prevents the collapse of the dome. Other dies and furnace furniture can be made for other geometries. The sintering cycle is similar to the temperatures and times used in Example 1. The finished monolithic lanthana doped yttria structure has a domed shape with passageways and a cavity to facilitate cooling and is transparent to infrared.

While there has been shown and described what is at present considered the preferred embodiment of the invention, it will be obvious to those skilled in the art that various changes and modifications may be made therein without departing from the scope of the invention as defined by the appended claims.

What is claimed is:

1. A ceramic monolithic structure having an internal cavity and passageways made by a method comprising the following steps:
    Step 1—forming a layered structure having a surface and a cavity contained therein by stacking individual sheets of a ceramic material having apertures in predetermined said sheets; stacking said individual sheets in a predetermined sequence to form a layered structure having a passageway and a cavity therein; said layered structure formed by said stacking of said individual sheets having a surface and a cavity connected to said surface thereof by said passageway;
    Step 2—filling said cavity and said passageway contained within said layered structure with a supporting media having a melting point greater than a pressing temperature obtained during a subsequent pressing step;
    Step 3—pressing the product from step 2 sufficiently to form a layered structure;
    Step 4—removing said supporting media from said cavity and said passageway of the product of step 3;
    Step 5—sintering the product from step 4 at a temperature sufficient to form a monolithic structure having a surface, said monolithic structure having a cavity contained therein and a passageway connecting the cavity to the said surface of said monolithic structure.

2. A transparent ceramic monolithic structure having an internal cavity and passageways made by a method comprising the following steps:
    Step 1—forming a layered structure having a surface and a cavity contained therein by stacking individual sheets of a ceramic material having apertures in predetermined said sheets; stacking said individual sheets in a predetermined sequence to form a layered structure having a passageway and a cavity therein; said layered structure formed by aid stacking of said individual sheets having a surface and a cavity connected to said surface thereof by said passageway;
    Step 2—filling said cavity and said passageway contained within said layered structure with a supporting media having a melting point greater than a pressing temperature obtained during a subsequent pressing step;
    Step 3—pressing the product from step 2 sufficiently to form a layered structure;
    Step 4—removing said supporting media from said cavity and said passageway of the product of step 3;
    Step 5—sintering the product from step 4 at a temperature sufficient to form a monolithic structure having a surface, said monolithic structure having a cavity contained therein and a passageway connecting the cavity to the said surface of said monolithic structure.

3. A ceramic domed shaped monolithic structure having an internal cavity and passageways made by a method comprising the following steps:
    Step 1—forming a layered structure having a surface and a cavity contained therein by stacking individual sheets of a ceramic material having apertures in predetermined said sheets; stacking said individual sheets in a predetermined sequence to form a layered structure having a passageway and a cavity therein; said layered structure formed by said stacking of said individual sheets having a surface and a cavity connected to said surface thereof by said passageway;
    Step 2—filling said cavity and said passageway contained within said layered structure with a supporting media having a melting point greater than a pressing temperature obtained during a subsequent pressing step;
    Step 3—pressing the product from step 2 sufficiently to form a layered structure;

Step 4—removing said supporting media from said cavity and said passageway of the product of step 3;

Step 5—sintering the product from step 4 at a temperature sufficient to form a monolithic structure having a surface, said monolithic structure having a cavity contained therein and a passageway connecting the cavity to the said surface of said monolithic structure.

* * * * *